May 14, 1968     FANG-SHANG CHEN ETAL     3,383,664
ELECTRO-OPTICAL STORAGE ARRANGEMENT
Filed March 31, 1967

INVENTORS F. S. CHEN
R. T. DENTON
BY
Herbert M. Shapiro
ATTORNEY

United States Patent Office 3,383,664
Patented May 14, 1968

3,383,664
ELECTRO-OPTICAL STORAGE ARRANGEMENT
Fang-Shang Chen, New Providence, and Richard T. Denton, South Plainfield, N.J., assignors to Bell Telephone Laboratories, Incorporated, Murray Hill, Berkeley Heights, N.J., a corporation of New York
Filed Mar. 31, 1967, Ser. No. 627,492
10 Claims. (Cl. 340—173)

ABSTRACT OF THE DISCLOSURE

Electrooptic materials such as lithium niobate and lithium tantalate, normally employed for modulators in digital light deflectors, exhibit damage when exposed to a laser beam of prescribed intensity. The damage, although detrimental when such materials are used for modulators, is turned to account by employing a sheet of such a material as an optical storage plane. Damage is selectively provided in bit locations in the plane by means of a first laser of suitable wavelength and intensity. Reading is by means of a second laser beam, insufficient to cause damage, in cooperation with means responsive to a change in the direction of the polarization vector of the second beam for detecting the presence and absence of damage.

Field of the invention

This invention relates to optical storage arrangements employing electrooptic materials.

Background of the invention

Optical storage arrangements are well known in the art. One well known optical storage arrangement includes a photographic film in which information may be stored rapidly. Such a film not only is fast but also has a high bit packing density and is well developed commercially. It is not erasable, however, and requires a time consuming developing process. Photochromic glasses are also used in storage arrangements but information fades relatively quickly therefrom. Ferrimagnetic garnets, on the other hand, maintain information without fading but high packing densities are not easily obtained.

An object of this invention is a new and novel, fast, nonfading, high capacity, optical storage medium.

Electrooptic single crystal lithium tantalate (LiTaO$_3$) and lithium niobate (LiNbO$_3$), for example, known to be useful as electrooptic modulators for digital light deflectors of the type described in the Bell System Technical Journal, vol. 43, p. 821, 1964, have been shown to exhibit detrimental damages when exposed to a laser beam. Such damage is reported in Applied Physics Letters, July 1, 1966, "Optically Induced Refractive Index Inhomogeneities in LiNbO$_3$ and LiTaO$_3$," p. 72.

Summary of the invention

This invention is based on the realization that such damage may be turned to account if a material capable of exhibiting the damage were employed as an optical storage medium rather than as an electrooptic modulator medium. Accordingly, in an illustrative embodiment of this invention single crystal LiNbO$_3$ is placed in the image plane of a digital light deflector and a laser beam is directed, via the light deflector, to selected positions in the image plane. Information is stored in the crystal as the presence and absence of damage at the selected storage locations. The medium is read via a laser beam of an intensity insufficient to cause such damage. The entire medium is erased by heat or selected bit locations are erased by radiation of a wavelength and intensity to remove the damage.

Detailed description

Figure 1:
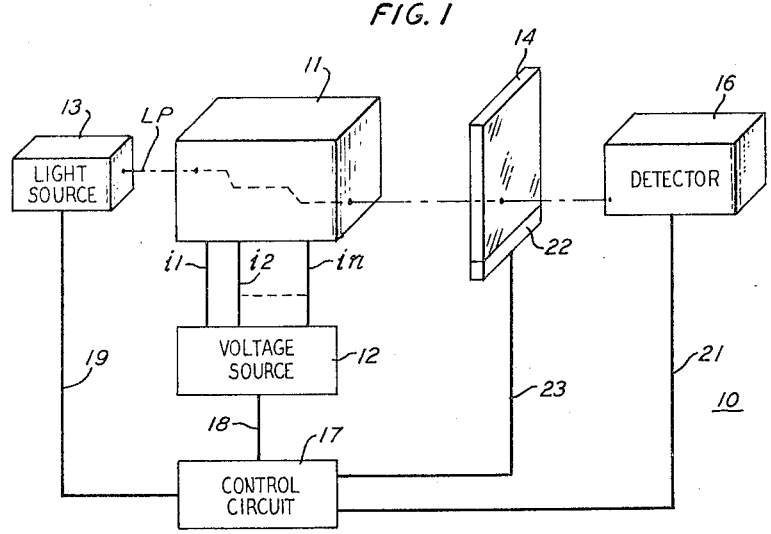
FIG. 1 is a schematic illustration of an optical storage arrangement in accordance with this invention.

FIG. 1 shows an optical storage arrangement 10 in accordance with this invention. The arrangement comprises a multistage digital light deflector represented by a block 11 including a plurality of inputs $i1$, $i2$, ... $in$. Each input is connected between a different stage of the deflector and a coded voltage source 12. Light projected from a source 13, conveniently a laser, is directed through the digital light deflector, along a light path as indicated by the broken line LP, to an output position determined by the presence and absence of voltages in the inputs to the deflector. Lenses common in the light path at the input and output of such deflectors are omitted in the figure. The function of such lenses is well understood and the lenses typically would be present in practice.

A sheet 14 of single crystal lithium niobate is positioned in the image plane of deflector 11, and a detector 16 is positioned adjacent sheet 14.

Sources 12, 13, and detector 16 are connected to a control circuit 17 via conductors 18, 19, and 21 respectively. The various sources and circuits may be any such elements capable of operating in accordance with this invention.

Figure 2:
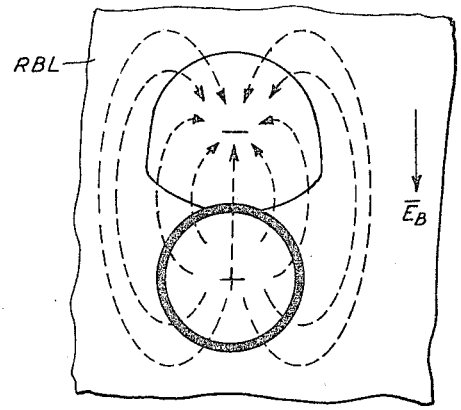
FIGS. 2 and 3 are schematic illustrations of portions of the storage arrangement of FIG. 1.

FIG. 2 shows a portion of a sheet 14 in accordance with this invention as viewed along the direction of the optical path. The portion shown corresponds to a representative bit location RBL in sheet 14 to which a laser beam from source 13 is directed via deflector 11 under the control of control circuit 17. A material useful in accordance with this invention is presumed to have trap sites caused by crystal imperfections. Such traps may release charge carriers upon photo or thermal excitation, or they may trap and hold charge carriers wandering into them. It is hypothesized that the laser beam causes the damage exhibited by sheet 14 by photoexciting electrons which drift under the influence of a polarization related built-in field and are trapped and held by such traps outside the laser spot. The origin of the built-in field is as yet unknown. But the field is always in a direction antiparallel to the spontaneous polarization of the material of sheet 14. In FIG. 2, the laser spot is indicated by the encircled plus sign and the electrons trapped outside the laser spot are indicated by the negative sign. The built-in field that drifts the photoexcited electrons out of the laser spot is represented in FIG. 2 by the downward directed arrow designated $\vec{E}_B$. The pattern of the local electric field resulting from the displacement of the negative charge from the (encircled) positive charge is indicated by the broken arrows in FIG. 2. This local field remains substantially unchanged at room temperature. Since the crystal is electrooptically active, such a field causes localized changes in the refractive indices of the material.

The localized changes may be understood in terms of the operation of an electrooptic modulator in a stage of a digital light deflector. In the absence of a field across the modulator, the polarization vector of polarized light emerging from the modulator material is in a first direction in the polarization plane; in the presence of a field, the polarization vector is in a second direction. The charge displacement initiated by the laser beam produces a local field causing such an effect. When the laser beam is shuttered during a select operation, under the control of control circuit 17 responsive to information bearing signals, no such effect is exhibited. The former may be taken to represent a binary one, the latter a binary zero.

Figure 3:
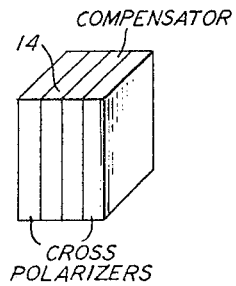

FIG. 3 shows a compensator and cross polarizers adjacent sheet 14. The compensator is conveniently set to compensate for the normal birefringence of the material of sheet 14 so that the cross polarizers extinguish any interrogate (polarized and relatively low intensity) light passed through a selected location where a zero is stored. When interrogate light passes through a selected position where a one is stored, the polarization vector of the emerging light, then, is "rotated" to a direction so that light passes to detector 16.

Generally the shorter the wavelength the higher the intensity, the faster the write operation. For example, writing into the storage plane is conveniently by means of an argon laser ($\lambda=.488$ A.) operated at 150 milliwatts for fast write operations. Reading is via a helium-neon laser ($\lambda=.633$ A.) which does not damage the material of sheet 14 at moderate power levels of, illustratively, one milliwatt.

The memory is erased, in its entirety, by elevating the material to a temperature in excess of about 170° C. at which temperature damage fades in the material. Such a temperature is provided conveniently via a heat source in contact with sheet 14 and under the control of control circuit 17. Such an element is represented by a block 22 contiguous sheet 14 in FIG. 1 and connected to control circuit 17 via a representative connection 23.

Selective erasure of a selected one or group of bits is provided via a beam of light from a mercury lamp. Such light may be collimated in a manner well understood in the art and directed through deflector 11 in the manner already described. The heat or the beam of light from a mercury lamp is presumed to excite the trapped negative charges at a position where a one is stored. These negative charges then combine with the positive charges and thus the local field indicated by the broken arrows of FIG. 2 disappears. This completes the erasure. Light from a mercury lamp may erase a group of bit locations rather than a selected bit location because the erase beam is of a diameter to include the positive and negative portions at a bit location as shown in FIG. 2. For high packing densities, next adjacent bit locations may be within that diameter.

Each bit location in memory is operated upon independently as described for the representative bit location. The memory, however, is capable of being adapted for word-organized operation in accordance with techniques well understood in the art.

The speed of writing is augmented by increasing the number of traps in the crystalline material. Since both $LiNbO_3$ and $LiTaO_3$ are volatile during crystal formation, the typical crystal growing process includes many vacancies (traps) in the lattice unless precautions are taken. When such crystals are formed for use as electrooptic modulator material, it is desirable to reduce the number of such traps and the crystal growing process is followed by a heat treatment in hydrogen so that hydrogen atoms can occupy the vacancies left by the volatilized $LiNbO_3$ or $LiTaO_3$. In accordance with the present invention, in contradistinction, such a step is omitted from the materials preparation process in order to maintain the number of traps high.

Single domained ferroelectric materials, in general, exhibit fairly large electrooptic effects giving rise to a local inhomogeneity of refractive indices when a local space charge field is created. Relatively high resistivity materials of, for example, $10^{12}$ ohm-centimeter are used because they typically have dense traps of deep energy levels. Dense traps are desirable for fast writing and a large bit density, and deep energy levels of the traps are desirable for preserving the memory over a relatively long time.

General considerations in the relationship between the size of the writing beam, the optical path length, and the writing time are now discussed. Although it is known that the damage affects mainly the extraordinary refractive index (its magnitude along the c axis of the storage crystal is different from that perpendicular to it), we assume the following isotropic distribution of refractive index to simplify the estimate of the beam spread caused by the damage.

$$n(r, z) = n_1 + \frac{n_2 r^2}{2}, \quad r \leq a(l)$$
$$n(r, z) = n_1 + \frac{n_2 a^2(l)}{2}, \quad r \geq a(l) \quad (1)$$

where $z$ is the direction of light propagation, $r$ is the radial coordinate, $a(l)$ is the beam radius after the optical path length $l$ where $l$ is the thickness of the memory plane, and $n_1$ is the homogeneous refractive index.

$$n_2 r^2 / 2$$

is the inhomogeneity caused by a laser beam and is assumed to be much smaller than $n_1$. The beam spread due to $n(r,z)$ of Equation 1 is approximately the spread of extraordinary ray in the real sample along the $c$ axis. Let $a(z)$ be the beam radius at $z$, then $$\frac{d^2 a}{dz^2} = \frac{n_2}{n_1} a \quad (2)$$

neglecting the beam spread due to diffraction. The solution of Equation 2 assuming $a(o) = a_0$ and $$\frac{da}{dz} = 0 \text{ at } z = 0$$

is $$a(z) = a_0 \cosh \sqrt{\frac{n_2}{n_1}} z \quad (3)$$

Assuming that $$\sqrt{\frac{n_2}{n_1}} l \ll 1$$

then $$\frac{a(l) - a_0}{a_0} = \frac{\Delta a}{a_0} \approx \frac{n_2}{n_1} \frac{l^2}{2} \quad (4)$$

The maximum of the inhomogeneous part of Equation 1 is $$\frac{n_2 a^2(l)}{2} \approx \frac{n_2 a_0^2}{2}$$

for a small beam spread. We will assume $$\frac{1}{2} n_2 a_0^2 = k I^m t \quad (5)$$

for a limited range of $t$, where $$I = \frac{P}{\pi a_0^2}$$

is the writing beam density (watt/$m^2$), P is the writing laser power and the laser intensity is assumed to be uniform over $\pi a_0^2$. $m$ is a constant and approximately equal to three. $t$ is the exposure time and $k$ is a constant which depends on the wavelength of the writing light.

The phase difference between the extraordinary and the ordinary rays of the reading light passing the written spot ("1") should differ from that passing the unwritten spot ("0") by a minimum, $\Delta \varphi_{min}$, in order to distinguish between "1" and "0."
Then $$\Delta \varphi_{min} = \frac{2\pi l}{\lambda} \frac{n_2 a_0^2}{2} \quad (6)$$

where $\lambda$ is the wavelength of the reading light.

Eliminating $n_2$ from Equations 4 and 6, one gets $$l = \frac{2 n_1 \pi}{\gamma \Delta \varphi_{min}} \left( \frac{\Delta a}{a_0} \right) \cdot a_0^2 \quad (7)$$

Thus, the memory plane is thin for a small beam size (a large bit density) if the beam spread is to be confined to a certain value $\Delta a$. The writing time, $t_w$, can be defined as the exposure time to produce $\Delta\varphi_{min}$. From Equations 5 and 7, it can be expressed as $$t_w = \frac{\pi^{m-2}\lambda^2 \Delta\varphi^2_{min}}{4kP^m} \cdot \frac{a_o^{2(m-1)}}{\left(\frac{\Delta a}{a_o}\right)} \quad (8)$$

Assuming $m>1$, Equation 8 shows that writing can be done faster for a small diameter beam. For example, let $n_1=2.2$, $\lambda=.63\mu$, $\Delta\varphi_{min}=1$ rad., $$\frac{\Delta a}{a_o} = 0.1$$

$2a_o=0.001''$, then $l=0.013''$ from Equation 7. Experimentation indicates that $P\approx20$ mw, $l=0.01''$ and $2a\approx0.001''$. Taking a small correction due to the difference in between the experimentation sample and the numerical example here, the writing time $t_w$ is essentially 0.1 second. As a second example, let $2a_o=0.005''$, $$\frac{\Delta a}{a_o} = 0.2$$

and $P=100$ mw. Also let us assume $m=3$. Then $l=0.006''$, and from Equation 8 and $t_w$ found in the previous example, $$t_w = \frac{0.1}{5^3 \times 2^4 \times 2} \approx 2.5 \times 10^{-5} \text{ second}$$

The bit density is mainly determined by the properties of the writing beam. If we assume that the beam diameter $2a_o=0.0005''$ and they are separated by $4a_o$ for good resolution, then the bit density is $10^6/\text{in.}^2$.

What has been described is considered to be only illustrative of the present invention. Accordingly, it is to be understood that other and numerous arrangements may be devised by one skilled in the art without departing from the spirit and scope of this invention.

What is claimed is:

1. An optical storage arrangement comprising a sheet of a material exhibiting a persistent inhomogeneity in its refractive indices when exposed to electromagnetic radiation of a first wavelength and of a first intensity, means responsive to information bearing signals selectively directing at selected positions in said sheet radiation of said first wavelength and of said first intensity for providing said inhomogeneity, means directing at selected positions in said sheet polarized radiation of a second wavelength and of a second intensity, means responsive to a change in the direction of the polarization vector of radiation of said second wavelength detecting the presence and absence of inhomogeneities at selected positions in said sheet, and means erasing said inhomogeneities from said positions in said sheet.

2. An optical storage arrangement in accordance with claim 1 wherein said sheet of material comprises single crystal lithium niobate.

3. An optical storage arrangement in accordance with claim 2 wherein said means directing radiation of a first wavelength comprises an argon laser.

4. An optical storage arrangement in accordance with claim 3 wherein said means directing radiation of a second wavelength comprises a helium-neon laser selectively reading said inhomogeneities.

5. An optical storage arrangement in accordance with claim 4 wherein said means erasing said inhomogeneity from said positions comprises a mercury lamp.

6. An optical storage arrangement in accordance with claim 1 wherein said sheet of material comprises single crystal lithium tantalate.

7. An optical storage arrangement in accordance with claim 6 wherein said means directing radiation of a first wavelength comprises an argon laser.

8. An optical storage arrangement in accordance with claim 7 wherein said means directing radiation of a second wavelength comprises a helium-neon laser selectively reading said inhomogeneities.

9. An optical storage arrangement in accordance with claim 8 wherein said means erasing said inhomogeneity from said positions comprises a mercury lamp.

10. In an optical storage arrangement comprising a sheet of material responsive to optical signals of a first wavelength and first intensity for storing information, means responsive to information bearing signals selectively directing at selected positions in said sheet radiation of said first wavelength and of said first intensity for storing said information, means directing at selected positions in said sheet polarized radiation of a second wavelength and of a second intensity, and means responsive to a change in the direction of the polarization vector of radiation of said second wavelength detecting the presence and absence of said radiation of said second wavelength at selected positions, the improvement which comprises the use of a sheet of a material exhibiting a persistent inhomogeneity in its refractive indices when exposed to radiation of said first wavelength.

References Cited
UNITED STATES PATENTS

| | | | |
|---|---|---|---|
| 2,909,973 | 10/1959 | Koelsch | 95—4.5 |
| 3,341,826 | 9/1967 | Lee | 340—173 |
| 3,353,894 | 11/1967 | Harris | 350—150 |

TERRELL W. FEARS, *Primary Examiner.*